Patented June 22, 1954

2,681,935

UNITED STATES PATENT OFFICE 2,681,935

STABILIZATION OF ARYL AMINO COMPOUNDS

Ralph B. Thompson, Hinsdale, Ill., assignor to Universal Oil Products Company, Chicago, Ill., a corporation of Delaware No Drawing. Application September 28, 1951, Serial No. 248,859

14 Claims. (Cl. 260—574)

This invention relates to the stabilization of amino compounds and more particularly to the stabilization of aryl amino compounds comprising phenylene diamines and/or aminophenols.

Phenylene diamines and aminophenols are particularly suitable for use as gum inhibitors in organic compounds and more particularly in unsaturated gasolines which undergo deterioration due to oxygen. These inhibitors are generally added to gasoline in amounts of from about 0.0001% to about 0.05% by weight, the exact amount depending upon the particular gasoline being treated. The inhibitor also may be utilized in addition to various dyes, antiknock agents, such as tetraethyl lead, metal deactivators, or other additives employed for specific purposes.

Phenylene diamines as, for example, N,N'-di-sec-butyl-para-phenylene diamine, are very effective inhibitors for gasoline but have the disadvantage that, upon standing for a period of time, they tend to darken and thereby to impart undesirable color to gasoline. In some cases, it is desired to market a water-white gasoline, and discoloration thereof due to the inhibitor is objectionable. In other cases, discoloration may cause confusion in identification of the gasoline. Many refiners identify their gasoline by color, and discoloration of a red gasoline to purple, for example, may cause confusion in this regard. Similarly, aminophenols as, for example, N-n-butyl-para-aminophenol, are very effective gum inhibitors but also tend to discolor upon standing.

One method of preventing discoloration of the inhibitor is to maintain a blanket of an inert gas, such as nitrogen, over the inhibitor during storage, but this is objectionable because of the added expense and care required. The present invention offers a novel and readily available method for preventing discoloration of these inhibitors, which method comprises the addition of a particular class of compounds which have been found to possess unexpected advantages in preventing the discoloration.

In one embodiment, the present invention relates to a method of stabilizing an amino compound which comprises adding thereto a stabilizing amount of an omega,omega'-bisaminoalkyl amine in which each of the carbon chains between nitrogen atoms contains at least 3 carbon atoms.

In a specific embodiment, the present invention relates to a method of stabilizing an aryl amino compound selected from the group consisting of phenylene diamines and aminophenols, which comprises adding thereto from about 0.0001% to about 10% by weight of an omega,-omega'-bisamino-alkyl amine in which each of the carbon chains between nitrogen atoms contains from about 3 to about 12 carbon atoms.

Of the phenylene diamines, N,N'-di-sec-alkyl-para-phenylene diamines are generally the most effective as gum inhibitors in organic compounds which tend to deteriorate due to oxygen, and N,N'-di-sec-butyl-para-phenylene diamine is a preferred inhibitor. Other satisfactory inhibitors include N,N'-di-isopropyl-para-phenylene diamine, N-isopropyl-N'-sec-butyl-para-phenylene diamine, N,N'-di-sec-amyl-para-phenylene diamine and various other phenylene diamines in which the substituent groups are the same or different.

Of the aminophenol inhibitors, N-normal-butyl-para-aminophenol is preferred, although other satisfactory inhibitors for gasoline include N-isopropyl-para-amino-phenol, N-sec-amyl-para-aminophenol, as well as other alkyl, aryl, alkaryl or aralkyl substituted aminophenols.

In accordance with the present invention, discoloration of amino compounds is retarded and/or prevented by adding thereto a small amount of an omega, omega'-bisamino-alkylamine in which each of the carbon chains between nitrogen atoms contains at least 3 carbon atoms. The stabilizing compounds of the present invention may be represented by the following general formula:

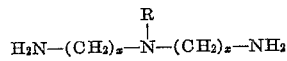

where $x$ is at least 3 and R is hydrogen or an organic substituent group.

A particularly preferred stabilizing compound for use in accordance with the present invention comprises 3,3'-bisaminopropyl amine, which may be represented by the following structural formula:

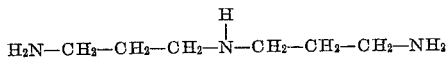

This compound also may be named 3,3'-imino-bispropyl amine or 1,5,9-triaza-n-nonane.

It is an important feature of the present invention that the stabilizing compound contains at least two amino groupings in terminal positions and thus are specified in the general definition as comprising omega, omega'-bisaminoalkyl amines. Furthermore, it is essential that each of the carbon chains between the nitrogen atoms contains at least 3 carbon atoms. As will be set forth in the examples appended to the present specification, these two characteristic features (namely, terminal amino groupings and carbon chains of at least 3 carbon atoms) are essential in the improved stabilizing compounds of the present invention. It appears that these two features mutually cooperate in yielding a stabilizing compound of unexpected superiority over other alkyl amines. Furthermore, it is preferred that each of the carbon chains between nitrogen atoms contains not more than about 12 carbon atoms.

As hereinbefore set forth, 3,3'-bisaminopropyl amine is a preferred stabilizing compound of the present invention. Other suitable but not necessarily equivalent stabilizing compounds include 4,4' - bisaminobutyl amine, 5,5' - bisaminoamyl amine, 6,6'-bisaminohexyl amine, 7,7'-bisaminoheptyl amine, 8,8'-bisaminooctyl amine, 9,9'-bisaminononyl amine, 10,10'-bisaminodecyl amine, 11,11'-bisaminoundecylamine, 12,12' - bisaminododecyl amine, etc., as well as mixed amines including omega-aminopropyl-omega'-aminobutyl amine, omega-aminopropyl-omega'-aminoamyl amine, omega-aminopropyl-omega'-aminohexyl amine, omega-aminopropyl-omega'-aminoheptyl amine, omega-aminopropyl-omega'-aminooctyl amine, omega-aminopropyl-omega'-aminononyl amine, omega-aminopropyl-omega'-aminodecyl amine, omega-aminopropyl-omega' - amino-undecyl amine, omega-aminopropyl-omega'-amino-dodecyl amine, etc., omega - aminobutyl-omega'-aminoamyl amine, omega-aminobutyl-omega'-aminohexyl amine, omega-aminobutyl-omega'-aminoheptyl amine, omega-aminobutyl-omega'-aminooctyl amine, omega-aminobutyl-omega'-aminononyl amine, omega-aminobutyl-omega'-aminodecyl amine, omega-aminobutyl-omega' - aminoundecylamine, omega - amino - butyl-omega'-aminododecyl amine, etc., omega-aminoamyl-omega'-aminohexyl amine, omega-aminoamyl-omega'-aminoheptyl amine, omega-aminoamyl-omega'-aminooctyl amine, omega-aminoamyl-omega'-aminononyl amine, omega-aminoamyl-omega'-aminodecyl amine, omega-aminoamyl - omega' - aminoundecyl amine, omega - aminoamyl - omega' - aminododecyl amine, etc., omega-aminohexyl-omega'-aminoheptyl amine, omega - aminohexyl - omega'-aminooctyl amine, omega-aminohexyl-omega'-aminononyl amine, omega-aminohexyl-omega'-aminodecyl amine, omega-aminohexyl-omega'-aminoundecyl amine, omega - aminohexyl - omega'-aminododecyl amine, etc., omega-aminoheptyl-omega'-aminooctyl amine, omega-aminoheptyl - omega' - aminononyl amine, omega - aminoheptyl-omega'-aminodecyl amine, omega-aminoheptyl - omega' - aminoundecyl amine, omega - aminoheptyl - omega' - aminododecyl amine, etc., omega-aminooctyl-omega'-aminononyl amine, omega-aminooctyl-omega'-aminodecyl amine, omega-aminooctyl-omega'-aminoundecyl amine, omega-aminooctyl-omega'-aminododecyl amine, etc.

Still other stabilizing compounds include those of the general structure hereinbefore set forth in which R comprises an organic substituent grouping. R preferably comprises a hydrocarbon grouping including alkyl, cycloalkyl, aryl, alkaryl, aralkyl, etc., although it may comprise aminoalkyl, aminocycloalkyl, aminoaryl, aminoalkaryl, aminoaralkyl, etc., groupings. Specific compounds in which R comprises an alkyl group include methyl 3,3'-bisamino-propyl amine, ethyl 3,3'-bisaminopropyl amine, propyl 3,3'-bisaminopropyl amine, butyl 3,3'-bisaminopropyl amine, amyl 3,3'-bisaminopropyl amine, hexyl 3,3'-bisaminopropyl amine, etc., methyl 4,4'-bisaminobutyl amine, ethyl 4,4'-bisaminobutyl amine, propyl 4,4'-bisaminobutyl amine, butyl 4,4'-bisaminobutyl amine, amyl 4,4'-bisaminobutyl amine, hexyl 4,4'-bisaminobutyl amine, etc., methyl 5,5'-bisaminoamyl amine, ethyl 5,5'-bisaminoamyl amine, propyl-5,5'-bisaminoamyl amine, butyl 5,5'-bisaminoamyl amine, amyl 5,5'-bisaminoamyl amine, hexyl 5,5'-bisaminoamyl amine, etc., methyl 6,6'-bisaminohexyl amine, ethyl 6,6'-bisaminohexyl amine, propyl 6,6'-bisaminohexyl amine, butyl 6,6'-bisaminohexyl amine, amyl 6,6'-bisaminohexyl amine, hexyl-6,6'-bisaminohexyl amine, etc. In still another embodiment, R may comprise a grouping containing carbon, hydrogen and oxygen and/or sulfur, including groupings as hydroxyalkyl, carbonyl, carboxyl, thia, etc. It is understood that two or more of the stabilizing compounds may be employed, and that the various compounds which may be prepared and used in accordance with the present invention are not necessarily equivalent in their activity but all of them will serve to effect stabilization of the aryl amino compounds.

The stabilizing compounds of the present invention may be prepared in any suitable manner. For example, 3,3'-bisaminopropyl amine may be prepared by the condensation of two mols of acrylonitrile with one mol of ammonia, followed by reduction with hydrogen. Similarly, ethyl 3,3'-bisaminopropyl amine may be prepared by the condensation of two mols of acrylonitrile with one mol of ethyl amine, followed by reduction with hydrogen.

The omega, omega'-bisaminoalkyl amine of the present invention generally is added to the aryl amino compound in an amount of from about 0.0001% to about 10% by weight of the aryl amino compound. 3,3' - bisaminopropyl amine is a colorless liquid which is readily soluble in the aryl amino compound and is readily incorporated therein. However, it is understood that, when desired, the omega, omega'-bisaminoalkyl amine may be dissolved in a suitable solvent, including alcohols, ketones, etc., and incorporated in the aryl amino compound in this manner.

In another embodiment it is preferred that the omega, omega'-bisaminoalkyl amine be incorporated in the aryl amino compound in a concentration of from about 0.001% to about 0.3% by weight of the aryl amino compound. With some aryl amino compounds the use of 3,3'-bisaminopropyl amine in concentrations above 0.3% tended to result in a somewhat hazy solution as water is absorbed from the air and, in such cases, it is preferred to utilize the 3,3'-bisaminopropyl amine in concentrations of below about 0.3% by weight as this has been found to avoid the development of a haze.

The omega, omega'-bisaminoalkyl amines of the present invention offer the further advantage in that they do not appear to react with mercaptans or other constituents contained in hydrocarbon fractions as do some of the other compounds heretofore proposed for the stabilization of aryl amino compounds. Thus, when the aryl amino compound comprises N,N' - di - sec - butyl - p-phenylene diamine and the N,N' - sec - butyl-p-phenylene diamine containing the omega, omega'-bisaminoalkyl amine is incorporated in gasoline, for example, the omega, omega'-bisaminoalkyl amine will not undergo undesirable reactions with the constituents of the gasoline and thereby will not result in undesirable degradation of the gasoline.

The omega, omega'-bisaminoalkyl amine is preferably added to the aryl amino compound as soon as practical following preparation of the aryl amino compound and thus will serve to prevent discoloration and other deterioration of the aryl amino compound during storage and transportation.

In some cases, it may be desirable to store and/or transport the aryl amino compound in the form of a solution of the acid salt as, for example, the hydrochloride salt of p-phenylene diamine. While these acid salts generally are more color stable than the p-phenylene diamine, they may become discolored after long periods of time and it is within the scope of the present invention to utilize the omega, omega'-bisaminoalkyl amine to retard or prevent this discoloration.

The following examples are introduced to illustrate further the novelty and utility of the present invention but not with the intention of unduly limiting the same.

EXAMPLE I

The aryl amino compound in this example comprised N,N'-di-sec-butyl-p-phenylene diamine. The additive used comprised 3,3'-bisaminopropyl amine. The color of the different samples was determined by the A. S. T. M. Photoelectric Color Method. The results are shown in the following table:

*Table I*

|  | A. S. T. M. Photoelectric Color | | | |
|---|---|---|---|---|
| Hours stored | 0 | 17 | 24 | 41 |
| Additive: | | | | |
| None | 98 | 40 | 12 | 0 |
| 0.2% 3,3'-bisamino propyl amine | 98 | 74 | 60 | 46 |

It will be noted that the additive of the present invention served to considerably retard discoloration of the aryl amino compound.

EXAMPLE II

In contrast to the results reported in Example I, other alkylene polyamines were considerably less effective for this purpose. This is illustrated by the following data relating to the stabilization of N,N'-di-sec-butyl-p-phenylene diamine with diethylene triamine and dipropylene triamine. These results are shown in the following table:

*Table II*

|  | A. S. T. M. Photoelectric Color | | |
|---|---|---|---|
| Hours stored | 0 | 24 | 48 |
| Additive: | | | |
| None | 90 | 10 | <0 |
| 0.2% 3,3'-bisaminopropyl amine | 90 | 26 | 6 |
| 0.2% diethylene triamine | 90 | 13 | <0 |
| 0.2% dipropylene triamine | 90 | 12 | <0 |

At the end of the 72 hours all samples except the sample containing the 3,3'-bisaminopropyl amine were extremely dark and cloudy, whereas the latter sample was still a clear liquid although darkened.

From the above data it is apparent that the 3,3'-bisaminopropyl amine is unexpectedly superior to its related compounds as represented by diethylene triamine and dipropylene triamine.

EXAMPLE III

N-n-butyl-p-aminophenol may be stabilized against discoloration by the addition thereto of 0.025% by weight of 3,3'-bisaminopropyl amine.

I claim as my invention:

1. A method of stabilizing an aryl amino compound selected from the group consisting of phenylene diamines and aminophenols which comprises adding thereto from about 0.0001% to about 10% by weight of a compound having the general formula:

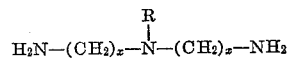

wherein $x$ is an integer from 3 to 12 and R is selected from the group consisting of hydrogen and alkyl radicals containing from 1 to 6 carbon atoms.

2. A method of stabilizing an aryl amino compound selected from the group consisting of phenylene diamines and aminophenols which comprises adding thereto from about 0.0001% to about 10% by weight of a compound having the general formula:

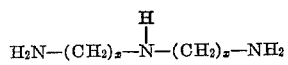

wherein $x$ is an integer from 3 to 12.

3. A method of stabilizing an aryl amino compound selected from the group consisting of phenylene diamines and aminophenols which comprises adding thereto from about 0.001% to about 10% by weight of 3,3'-bisaminopropyl amine.

4. An aryl amino compound selected from the group consisting of phenylene diamines and aminophenols containing from about 0.001% to about 10% by weight of a compound having the general formula:

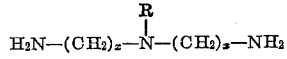

wherein $x$ is an integer from 3 to 12 and R is selected from the group consisting of hydrogen and alkyl radicals containing from 1 to 6 carbon atoms.

5. An aryl amino compound selected from the group consisting of phenylene diamines and aminophenols containing from about 0.001% to about 10% by weight of a compound having the general formula:

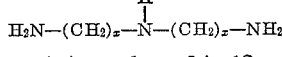

wherein $x$ is an integer from 3 to 12.

6. An aryl amino compound selected from the group consisting of phenylene diamines and aminophenols containing from about 0.0001% to about 10% by weight of 3,3'-bisaminopropyl amine.

7. A method of stabilizing an N,N'-di-alkyl-p-phenylene diamine which comprises adding thereto from about 0.0001% to about 10% by weight of 3,3'-bisaminopropyl amine.

8. A method of preventing discoloration of N,N'-di-sec-butyl-p-phenylene diamine which comprises adding thereto from about 0.001% to about 0.3% by weight of 3,3'-bisaminopropyl amine.

9. A method of stabilizing an N-alkyl-p-aminophenol which comprises adding thereto from about 0.0001% to about 10% by weight of 3,3'-bisaminopropyl amine.

10. A method of stabilizing N-n-butyl-p-aminophenol which comprises adding thereto from about 0.001% to about 0.3% by weight of 3,3'-bisaminopropyl amine.

11. An N,N'-di-alkyl-p-phenylene diamine containing from about 0.0001% to about 10% by weight of 3,3'-bisaminopropyl amine.

12. N,N'-di-sec-butyl-p-phenylene diamine containing from about 0.001% to about 0.3% by weight of 3,3'-bisaminopropyl amine.

13. An N-alkyl-p-aminophenol containing from about 0.0001% to about 10% by weight of 3,3'-bisaminopropyl amine.

14. N-n-butyl-p-aminophenol containing from about 0.001% to about 0.3% by weight of 3,3'-bisaminopropyl amine.

References Cited in the file of this patent

UNITED STATES PATENTS

| Number | Name | Date |
|---|---|---|
| 2,181,122 | Downing et al. | Nov. 28, 1939 |
| 2,256,753 | Scheumann | Sept. 23, 1941 |
| 2,370,552 | Lincoln et al. | Feb. 27, 1945 |
| 2,498,630 | Thompson | Feb. 28, 1950 |
| 2,512,297 | Biswell et al. | June 20, 1950 |
| 2,521,425 | Thompson | Sept. 5, 1950 |